United States Patent
Lee et al.

(10) Patent No.: US 11,000,048 B2
(45) Date of Patent: May 11, 2021

(54) METHOD OF PRODUCING PROTEIN-CONTAINING POWDER

(71) Applicant: KOREA MCNULTY CO., LTD., Cheonan-si (KR)

(72) Inventors: Eun Jung Lee, Seoul (KR); Il Nam Lee, Gimpo-si (KR); Ho Jun Jeong, Seoul (KR)

(73) Assignee: Korea McNulty Co., Ltd., Cheonan-si (KR)

( * ) Notice: Subject to any disclaimer, the term of this patent is extended or adjusted under 35 U.S.C. 154(b) by 0 days.

(21) Appl. No.: 16/178,079

(22) Filed: Nov. 1, 2018

(65) Prior Publication Data

US 2019/0133150 A1    May 9, 2019

(30) Foreign Application Priority Data

Nov. 9, 2017 (KR) .................. 10-2017-0148439
Dec. 18, 2017 (KR) .................. 10-2017-0174005

(51) Int. Cl.
| | | |
|---|---|---|
| A23J 1/14 | (2006.01) | |
| A23J 1/02 | (2006.01) | |
| A23J 3/24 | (2006.01) | |
| A23J 3/14 | (2006.01) | |
| A23L 3/375 | (2006.01) | |
| A23L 3/44 | (2006.01) | |
| A23J 1/00 | (2006.01) | |
| A23J 3/16 | (2006.01) | |

(52) U.S. Cl.
CPC . *A23J 1/14* (2013.01); *A23J 1/00* (2013.01); *A23J 1/02* (2013.01); *A23J 3/14* (2013.01); *A23J 3/16* (2013.01); *A23J 3/24* (2013.01); *A23L 3/44* (2013.01); *A23L 3/375* (2013.01); *A23V 2002/00* (2013.01)

(58) Field of Classification Search
CPC ........ A23J 1/14; A23J 1/00; A23J 1/02; A23J 3/14; A23J 3/16; A23J 3/24; A23J 3/44; A23J 3/375; A23V 2002/00
See application file for complete search history.

(56) References Cited

U.S. PATENT DOCUMENTS

| | | | | |
|---|---|---|---|---|
| 2010/0233348 A1* | 9/2010 | Watanabe | ................ | C11B 9/02 |
| | | | | 426/651 |
| 2015/0132433 A1* | 5/2015 | Dossey | ..................... | A23L 3/40 |
| | | | | 426/2 |
| 2019/0037904 A1* | 2/2019 | Daly | ..................... | A23L 29/284 |
| 2019/0069575 A1* | 3/2019 | Shigeta | ................ | A23K 40/00 |

FOREIGN PATENT DOCUMENTS

| | | |
|---|---|---|
| KR | 1020070088874 A | 8/2007 |
| KR | 1020110078469 A | 7/2011 |

OTHER PUBLICATIONS

Mesh Micron Chart. 2020. https://www.industrialspec.com/resources/mesh-and-micron-sizes.*
English Translation for KR 20070088874 published Aug. 2007.*

* cited by examiner

*Primary Examiner* — Anthony J Weier
(74) *Attorney, Agent, or Firm* — Dentons US LLP

(57) ABSTRACT

The present disclosure relates to a method of producing a protein-containing powder including: (a) providing a protein-containing raw material; (b) freezing the protein-containing raw material at −196° C. to −80° C.; and (c) grinding the protein-containing raw material to obtain the protein-containing powder, wherein an average particle size of the protein-containing powder is smaller than a cell size of the protein-containing raw material.

7 Claims, 14 Drawing Sheets

Process1

Temperature : −196 ~ −80°C
Particle : 5 ~ 30μm
Particle Temperature : −120 ~ −20°C

FIG.9

| Cricket (Oil Extraction ○) General Grinding | |
|---|---|
| Magnification | X 120 | X 250 |

METHOD OF PRODUCING PROTEIN-CONTAINING POWDER

CROSS-REFERENCE TO RELATED APPLICATIONS

This application claims priority to and the benefit of Korean Patent Application No. 10-2017-0148439 filed in the Korean Intellectual Property Office on Nov. 9, 2017 and 10-2017-0174005 filed in the Korean Intellectual Property Office on Dec. 18, 2017, the entire contents of which are incorporated herein by reference.

TECHNICAL FIELD

The present disclosure relates to a protein-containing powder and a method for producing thereof using cryogenic micro grinding technology. This method maximally maintains nutritious ingredients and improves in vivo absorption rate and digestion rate of the nutritious ingredients by minimizing destruction of the nutritious ingredients when a protein-containing raw material (e.g., insects such as crickets and mealworms and beans such as black beans) is ground and powdered using a cryogenic micro grinding technology.

BACKGROUND ART

Protein is generally taken in through meat protein, insect protein, bean protein and/or milk protein.

Bean is an excellent vegetable protein source, which has become an important protein source in the form of food such as tofu, fermented soybean paste, red pepper paste, bean paste prepared with ground fermented soybean, soybean milk, and soybean oil, and has also widely been used as an industrial raw material such as medicine, cosmetics, and soap in addition to the protein source. Recently, as studies on not only nutritional aspects of bean, but also physiologically active materials such as hemagglutinin, saponin, and isoflavones have been actively conducted, bean has come into the limelight as a functional food due to attention to health functional effects such as anticancer, anti-atherosclerotic, antioxidant, hypoglycemic, and antibacterial effects.

Since bean contains 9.2% of moisture, 41.3% of protein, 17.6% of crude fat, 22.6% of glucide, 3.5% of crude fiber, and 5.8% of ash, and particularly, essential fatty acids and essential amino acids are evenly contained therein, bean has been used as a processed food such as fermented soybean paste, soy sauce, tofu, and bean sprout for a long period of time. However, as anticancer effects, cholesterol reducing effects, immunity reinforcement, adult disease preventing effects, and the like of bean have been recently revealed, attempts to use bean in the non-processed and uncooked form have been made, but bean has such a hard structure that bean in a non-processed state has disadvantages in that the digestion absorption rate is low and the inherent odor from the bean reduces the appetite.

Meanwhile, it is known that edible insects have a higher content of nutritious ingredients and a better efficacy than those of other food groups. Typically, edible insects retain a high protein content of 50% to 70% on average and also contain abundant nutritious ingredients rich in essential amino acids, unsaturated fatty acids, minerals, vitamins, and the like. In particular, it has been reported that ingredients contained in an edible insect are effective for a specific disease, and it is known that various ingredients isolated from insects are effective for the prevention and treatment of a disease, such as a mealworm beetle having effects of suppressing neurotoxic stimulant substances, *Protaetia brevitarsis* seulensis (Kolbe) having anti-tumor effects, and *Trypoxylus dichotomus* having anti-obesity effects. Further, a cricket has ingredients which help to protect the liver and detoxify alcohol, and is used as an antipyretic, a diuretic, and therapeutic food for neurolepsis, urinary retention, and gynecological dystocia in Oriental medicine. Due to attention to the ecological, socioeconomic, nutritional, and functional values of these edible insects, countries in the world have utilized edible insects in various fields such as the development of general foods, functional foods, medicines, livestock feedstuffs, and relief foods for underdeveloped countries by using edible insects as an edible material. However, many people have an aversion to eating edible insects as a food and have generally rejected against edible insects so far so that even though edible insects are a food material having excellent nutritious ingredients, edible insects fail to be variously utilized.

Thus, the present inventors powdered edible protein-containing raw materials (e.g., insects such as mealworm and crickets and beans such as black beans) using a cryogenic micro grinding technology, thereby producing a portable protein-containing food powder which is highly portable and easily digestible.

SUMMARY OF THE INVENTION

According to one aspect of the present invention, a method of producing a protein-containing powder is provided, which comprises: (a) providing a protein-containing raw material; (b) freezing the protein-containing raw material at −196° C. to −80° C.; and (c) grinding the protein-containing raw material to obtain the protein-containing powder, wherein an average particle size of the protein-containing powder is smaller than a cell size of the protein-containing raw material.

The protein-containing raw material may be bean, and the average particle size may be 5 to 30 μm. The bean may be selected from the group consisting of soybean, black bean, and pea. The method may further comprise: drying the protein-containing raw material at 30 to 50° C. for 4 to 12 hours after step (a), or drying the protein-containing powder at 20 to 45° C. for 2 to 10 hours after step (c).

The protein-containing powder may have a higher nutrient retention rate than the protein-containing raw material, and the protein-containing powder may have a higher in vivo digestion rate than the protein-containing raw material.

The protein-containing raw material may be an edible insect, and the average particle size may be 10 to 60 μm. The edible insect may be cricket or mealworm. The method may further comprise: drying the protein-containing raw material at 40 to 50° C. for 6 to 12 hours after step (a), or drying the protein-containing powder at 40 to 50° C. for 4 to 10 hours after step (c). The method may further comprise removing fat from the protein-containing raw material after step (a).

The freezing may be performed by using a liquid nitrogen. The temperature of the protein-containing powder may be maintained between −140° C. to −20° C. during the grinding step (c).

DETAILED DESCRIPTION

In accordance with another aspect of the present invention, a protein-containing powder comprising a freeze-dried and ground protein-containing raw material is provided, wherein the protein-containing raw material may be bean and/or edible insect, and an average particle size of the protein-containing powder may be smaller than a cell size of the protein-containing raw material, and the protein-containing powder may have a higher nutrient retention rate than the protein-containing raw material, and the protein-containing powder may have a higher in vivo digestion rate than the protein-containing raw material.

In yet another aspect of the present invention, a food product comprising the above protein-containing powder is provided. The food product may further comprise: one or more of a carrier, a diluent, an excipient, and an additive. The food product may be in a form of a powder, a granulated granule product, a pill, a bar form, a liquid form, a hard capsule, a soft capsule, or a tablet.

These and other aspects will be appreciated by one of ordinary skill in the art upon reading and understanding the following specification.

The present disclosure is related to a cryogenic micro grinding technology (CMGT), which may include a technology of directly grinding raw materials (e.g., beans) into a fine powder in a state where the raw materials (e.g., beans) are frozen hard at a cryogenic temperature of −196° C. to −80° C. by introducing liquid nitrogen. In general, when a protein-containing raw materials (e.g., beans) are ground without drying the raw material, they cannot be substantially ground due to moisture contained in the raw material, and even though the raw material is subjected to a drying step, a mashed ground product in a gel state is obtained due to the remaining moisture if the raw material is not in a completely dried state. Meanwhile, the cryogenic micro grinding technology freezes a raw material containing moisture as it is at a cryogenic temperature by immersing the raw material into liquid nitrogen and freeze-grinds the raw material while maintaining the cryogenic state by supplying liquid nitrogen, and is characterized in that by grinding the form of the raw material hard in a frozen state, the raw material can be completely powdered even though the raw material contains moisture, and a powder can be obtained.

According to an exemplary embodiment of the present disclosure, while liquid nitrogen is introduced into the raw material in a range of −196° C. to −80° C. and the raw material is subjected to a grinding process, the temperature (grinding temperature) of particles may be controlled to −140° C. to −20° C. When the grinding temperature is lower than −140° C., the particle size of the ground product may be further decreased, but the efficiency deteriorates, and when the grinding temperature is higher than −20° C., the raw material is not properly ground, so that the ground product has a particle size similar to that obtained by general grinding.

The protein-containing raw material can be any raw material originated from animal or plant source which contains protein. The protein-containing raw material can be beans or edible insects. For example, the beans can be soybean, black bean, and/or pea, and the edible insects can be cricket or mealworm. The average particle size of the protein-containing powder can be smaller than the cell size of the protein-containing raw material, i.e., 5 to 30 μm. In doing so, nutrient retention rate and in vivo digestion rate of the protein-containing powder can be increased than those of the raw materials.

When beans are used as the protein-containing raw material, the raw material may be dried at 30 to 50° C. for 4 to 12 hours, before the freezing step, or dried at 20 to 45° C. for 2 to 10 hours after the grinding step. Drying can be performed by any one method of a hot-wind drying method, a freeze-drying method, or a microwave drying method as the drying method.

When edible insects are used as the protein-containing raw material, the average particle size of the protein-containing powder can be smaller than the cell size of the protein-containing raw material, i.e., 10 to 60 μm. In this case, the raw material may be dried at 40 to 50° C. for 6 to 12 hours, before the freezing step, or dried at 40 to 50° C. for 4 to 10 hours after the grinding step. Drying can be performed by any one method of a hot-wind drying method, a freeze-drying method, or a microwave drying method as the drying method.

In yet another exemplary embodiment of the present disclosure, the method may further include a fat removing step before the freezing step.

The edible insect powder may be characterized by maintaining a content of nutritious ingredients which the edible insect raw material contains and may be characterized by increasing a digestion rate in the body. the fat removing step is for increasing the protein content of the raw material and preventing the raw material from being acidified.

Meanwhile, it is possible to provide a food product, e.g., a health functional food, including the protein-containing powder according to the present disclosure. The food product further includes one or more of a carrier, a diluent, an excipient, and an additive, and thus, may be characterized by being formulated with one selected from the group consisting of a tablet, a pill, a pulvis, a granule, a powder, a capsule, and a liquid formulation.

Examples of a food to which the powder of the present disclosure can be added include various foods, a powder, a granule, a tablet, a capsule, a syrup, a bar form, and the like. As the additive, it is possible to use one or more ingredients selected from the group consisting of a natural carbohydrate, a flavorant, a nutrient, a vitamin, a mineral (electrolyte), a flavoring agent (a synthetic flavoring agent, a natural flavoring agent, and the like), a colorant, a filler (cheese, chocolate, and the like), pectic acid and a salt thereof, alginic acid and a salt thereof, organic acid, a protective colloid thickener, a pH adjusting agent, a stabilizer, a preservative, an antioxidant, glycerin, alcohol, a carbonating agent, and fruit pulp.

Examples of the above-described natural carbohydrate include common sugars such as monosaccharides, for example, glucose, fructose and the like; disaccharides, for example, maltose, sucrose and the like; and polysaccharides, for example, dextrin, cyclodextrin and the like, and sugar alcohols such as xylitol, sorbitol, and erythritol. As the flavorant, a natural flavorant (thaumatin, stevia extract (for example, Rebaudioside A, glycyrrhizin and the like), and a synthetic flavorant (saccharin, aspartame and the like) may be advantageously used.

The food product of the present disclosure may contain various nutrients, vitamins, minerals (electrolytes), flavoring agents such as synthetic flavoring agents and natural flavoring agents, colorants and fillers (cheese, chocolate, and the like), pectic acid and salts thereof, alginic acid and salts thereof, organic acids, protective colloid thickeners, pH adjusting agents, stabilizers, preservatives, glycerin, alcohols, carbonating agents used in a carbonated beverage, or the like, in addition to the additives.

Specific examples of the carrier, the excipient, the diluent, and the additive are not limited to the followings, but it is preferred that one or more selected from the group consisting of lactose, dextrose, sucrose, sorbitol, mannitol, erythritol, starch, acacia rubber, calcium phosphate, alginate, gelatin, calcium phosphate, calcium silicate, microcrystalline cellulose, polyvinylpyrrolidone, cellulose, water, sugar syrup, methyl cellulose, methyl hydroxybenzoate, propyl hydroxybenzoate, talc, magnesium stearate, and mineral oil are used.

When the food product according to the present disclosure is formulated, the food product is prepared by using a diluent or excipient, such as a filler, an extender, a binder, a wetting agent, a disintegrant, and a surfactant, commonly used. The content of the protein-containing powder according to the present disclosure as an effective ingredient in the above-described formulation may be appropriately adjusted by the use form and purpose, the condition of a patient, the type and severity of symptom, and the like, and may be 0.001 to 99.9 wt %, preferably 0.01 to 50 wt % based on the weight of a solid content, but is not limited thereto.

The protein-containing powder according to the present disclosure may be commercialized as a patient food, a senior food, an infant food, a nutrition food, a space food, a diet food, a protein supplemented food, and an antioxidant supplemented food. According to the purpose which needs supply of proteins, 10 to 80% of the powder according to the present disclosure is contained, and may be utilized as a powder, or processed to be a granulated granule product, a pill, a bar form, a product in the form of liquid food, or a product in the form of a hard capsule, a soft capsule, a tablet, and the like. For example, the patient food may be used in a product for a patient during the recovery period, who is in need of protein supply, and may be used as a powder or granulated granule product, or a liquid food or tube food product, which contains 20 to 70% of the powder according to the present disclosure. The senior food and the infant food may be used in a product for a senior or an infant, who is in need of protein supply, and may be used as a powder or granulated granule product, a pill, a bar form, or a product in the form of liquid food, which contains 20 to 70% of the insect powder according to the present disclosure. The nutrition food may be used in a product for a minor or an adult, who is in need of protein supply, and may be used as a powder or granulated granule product, a bar form, or a product in the form of liquid food, which contains 10 to 60% of the powder according to the present disclosure. The diet food may be used in a product for the purpose of diet, which mainly supplies protein, and may be used as a powder or granulated granule product and a product in the form of a hard capsule, a soft capsule, a tablet, a pill, and a bar, which contains 30 to 90% of the powder according to the present disclosure.

According to the present disclosure, there are effects in that by minimizing destruction of nutritious ingredients during a process of grinding beans high in protein content to a micro size of 5 to 30 µm at a cryogenic temperature of −196 to −80° C., nutritious ingredients are maximally maintained and in vivo digestion rate is improved.

According to the present disclosure, there are effects in that by minimizing destruction of nutritious ingredients during a process of grinding edible insects high in protein content to a micro size of 10 to 60 µm at a cryogenic temperature of −196 to −80° C., nutritious ingredients are maximally maintained and in vivo digestion rate is improved.

BRIEF DESCRIPTION OF THE DRAWINGS

FIG. 9 is an SEM cross-sectional image of powder obtained by subjecting crickets to general grinding.

Figure 1:
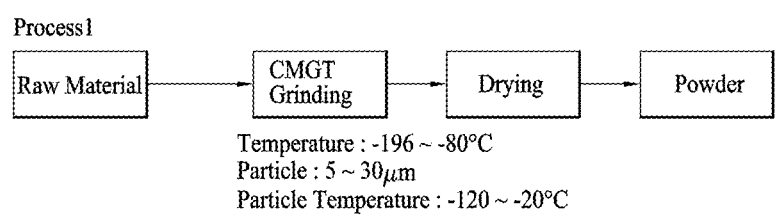
FIG. 1 illustrates a bean powdering process according to the present CMGT method.
Figure 2:
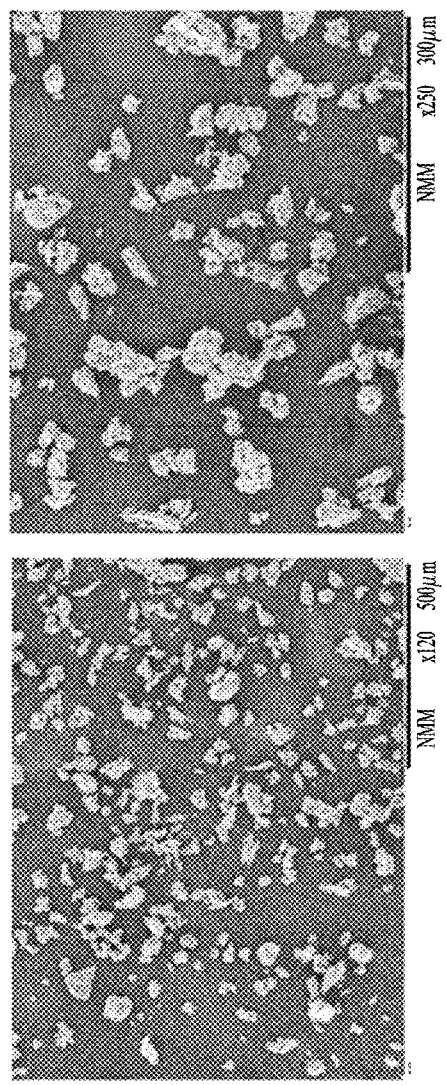
FIG. 2 is an SEM cross-sectional image of powder obtained by subjecting black beans to cryogenic micro grinding.
Figure 3:
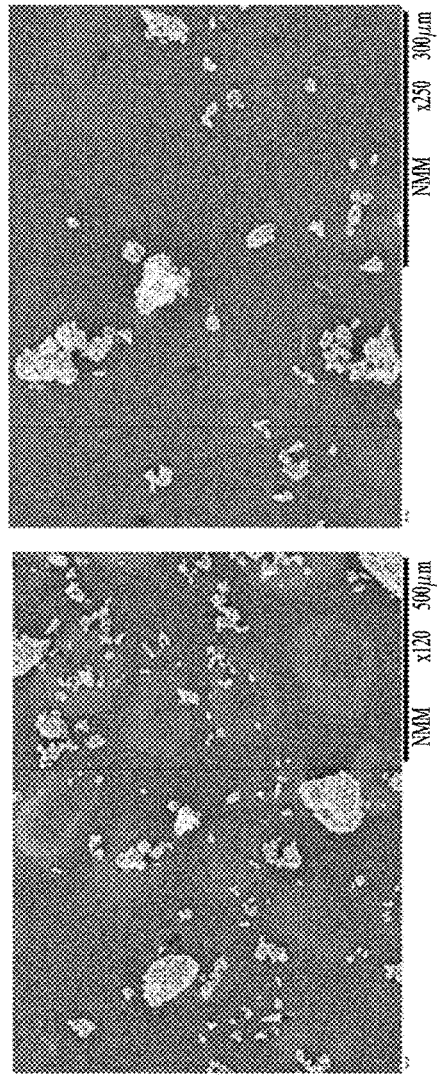
FIG. 3 is an SEM cross-sectional image of powder obtained by subjecting black beans to general grinding.
Figure 4:
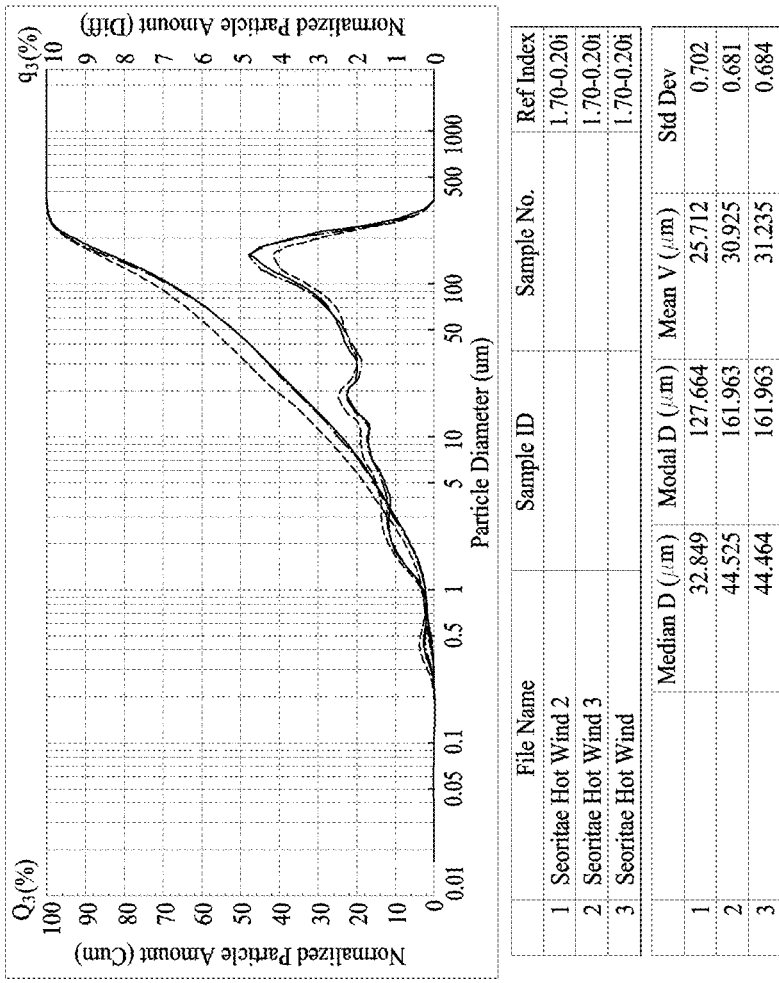
FIG. 4 illustrates particle size analysis results of powder obtained by subjecting black beans to general grinding.
Figure 5:
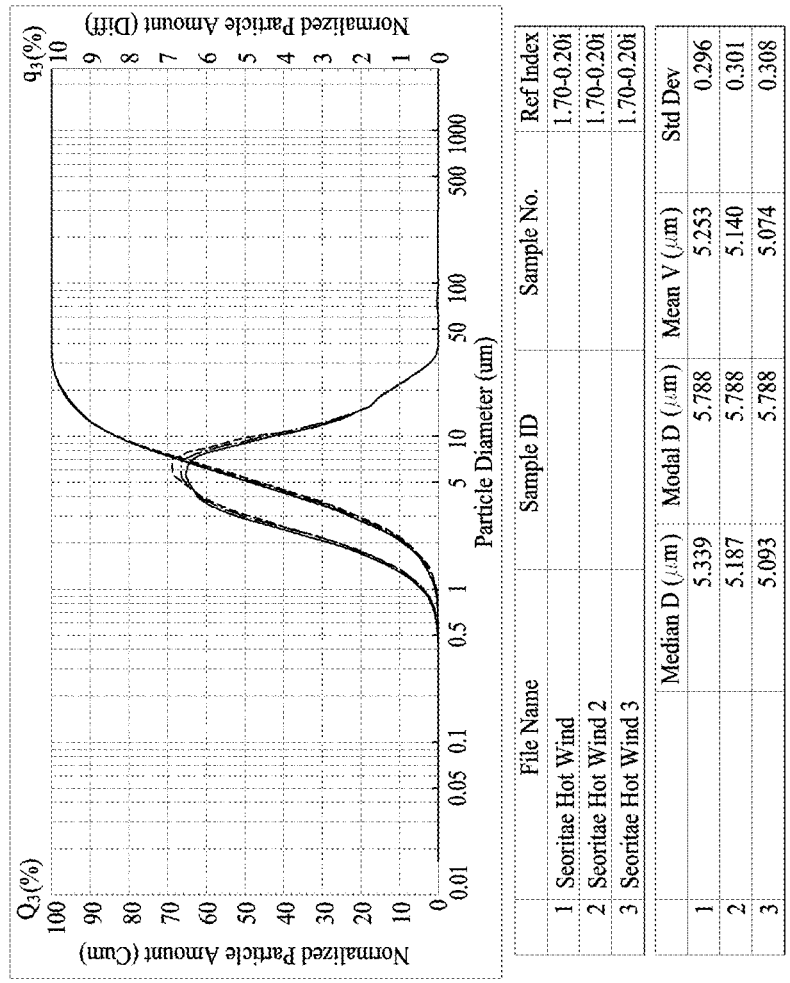
FIG. 5 illustrates particle size analysis results of powder obtained by subjecting black beans to cryogenic micro grinding.
Figure 6:
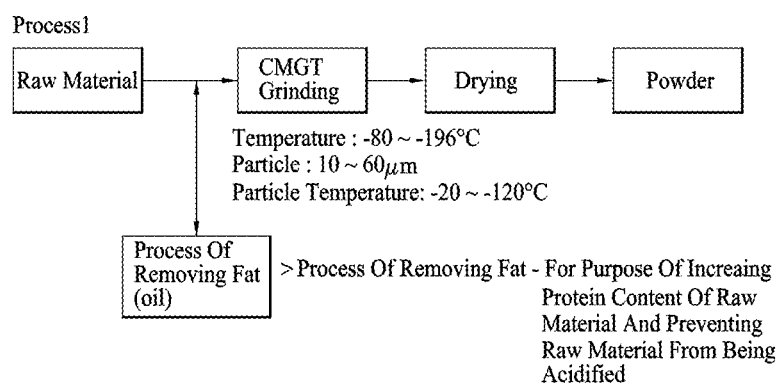
FIG. 6 illustrates an edible insect powdering process according to the present CMGT method.

Hereinafter, the present disclosure will be described in more detail through Examples. These Examples are provided only for more specifically describing the present disclosure, and it will be obvious to a person with ordinary skill in the art to which the present disclosure pertains that the scope of the present invention is not limited by these Examples according to the gist of the present disclosure.

Example 1

Preparation and Grinding of Black Beans

In a Nonghyup Hanaro Mart, black beans (seoritae) bought by Aunae Nonghyup in Cheonan were purchased. The black beans were cleanly washed with flowing water and prepared, and two experiments of general grinding and cryogenic micro grinding were carried out in order to confirm effects of grinding conditions on preservation and availability of nutrients of black beans.

For the cryogenic micro grinding, the prepared black beans were immersed into liquid nitrogen and frozen at −190° C. and were subjected to cryogenic micro grinding while the temperature was maintained at −190° C. by supplying liquid nitrogen while grinding the black beans. In this case, the particle size of the ground black beans and the particle temperature were measured to be 5 to 30 µm and −120 to −20° C., respectively.

Meanwhile, the beans were ground by a general grinding method for comparison with the cryogenic micro grinding. For the general grinding, cutting, mixing, and grinding were performed for 3 minutes, 3 minutes, and 3 minutes, respectively, by using a home grinder (Shinil Industrial Co., Ltd., SMX-4000DY, Korea). For heat generated during the grinding, the temperature of the powder was measured by using a non-contact type temperature measuring apparatus (Giltron GT300, Taiwan), and the maximum temperature during the grinding was 85° C.

For the drying process, the powder was dried at 20 to 50° C. for 2 to 12 hours by using a general drier (SH-40C, Sh Scientific, Sejong, Korea). When the beans were dried before the grinding, the powder was dried at 30 to 50° C. for 4 to 12 hours, and then was subjected to cryogenic micro grinding, and when the powder was subjected to cryogenic micro grinding, and then was dried, the powder was dried at 20 to 45° C. for 2 to 10 hours. It could be physically seen that the drying after the grinding generally requires a short time for drying as compared to the drying before the grinding, and reduces the inherent odor from the bean.

In order to study the particle sizes, particle structures and distributions, and structural analyses of a ground product obtained by general grinding and a ground product obtained by cryogenic micro grinding, a particle size analysis was performed. The particle sizes were measured, and imaging data of particles, such as texture, structure, and shape were measured by a scanning electron microscope. The particle size distribution 10% and 90% values, average particle diameters and median values of powder obtained by general grinding and powder obtained by cryogenic micro grinding were measured (Table 1).

TABLE 1

|  |  | Particle size (µm) | | | |
| --- | --- | --- | --- | --- | --- |
|  |  | Average value | Median value | d10 | d90 |
| Black bean (Seoritae) | General grinding | 29.29 ± 3.58 | 40.61 ± 7.76 | 2.760 ± 0.28 | 174.05 ± 4.46 |
|  | Freeze grinding | 5.16 ± 0.09 | 5.21 ± 0.1 | 2.09 ± 0.04 | 12.60 ± 0.03 |

As a result, it was confirmed that the average particle size of a sample obtained by subjecting black beans to cryogenic micro grinding was 5.16±0.09 µm, the shapes of the particles were generally round or close to a rice grain shape, and the particles were generally evenly distributed. In contrast, the average particle size of a sample obtained by subjecting the black beans to general grinding was 29.29±3.58 µm, most of the shapes of the particles were not round, but were angular, and the shapes and sizes of the particles were irregularly distributed.

Meanwhile, the size of a cell is 2 to 100 µm and the average particle size of ground products of the black beans obtained by cryogenic micro grinding is 5.16±0.09 µm, so that it can be seen that black beans are ground to less than the cell size by cryogenic micro grinding. Furthermore, a d10 value of 2.09±0.04 by cryogenic micro grinding means that the amount of a powder having a diameter less than the size is 10%, and a d90 value of 12.60±0.03 by cryogenic micro grinding means that the amount of a powder having the size is 90%.

Example 2

Analysis Results of Nutritious Ingredients of Black Bean

The analysis of nutritious ingredients was performed in Suwon Women's College Food Analysis Research Center under the generally known methods described in CODEX. The contents of the nutritious ingredients shown in the following table were converted into moisture 0% and marked in order to compare the general grinding with the cryogenic micro grinding at 1:1.

TABLE 2

Comparison of Nutritious Ingredients between Black Bean Raw Material and Ground Product Obtained by Cryogenic Micro Grinding

|  |  | Cryogenic Micro Powder | |
| --- | --- | --- | --- |
| Nutritious Ingredient | Black bean (Raw material) | Content | Retention rate (%) |
| Protein (g/100 g) | 38.74 | 39.72 | 102.53 |
| Calorie (Kcal/100 g) | 383.48 | 401.3 | 104.65 |
| Ash (g/100 g) | 5.44 | 5.52 | 101.47 |
| β-carotene (µg/100) | 16.85 | 38.57 | 228.90 |
| Ca (mg/100) | 216.02 | 205.75 | 95.25 |
| Fe (mg/100) | 10.49 | 10.07 | 96.00 |
| K (mg/100) | 2,085.50 | 2,075.98 | 99.54 |
| P (mg/100) | 683.09 | 730.68 | 106.97 |
| Vit B2 (mg/100) | 0.24 | 0.32 | 133.33 |
| Fiber (g/100 g) | 31.13 | 31.87 | 102.38 |

A ground product of black beans obtained by cryogenic micro grinding had a protein retention rate of 102.53%, which is higher than that of the raw material, and exhibited resulting values for excellent nutrition retention property in calcium, potassium, phosphorus, vitamin B2, β-carotene, and the like.

The ground product obtained by cryogenic micro grinding has a nutritious ingredient retention rate of more than 100% as compared to that of the raw material because the higher the grindability is, the larger the surface area is, and as a result, nutritious ingredients are more likely to be eluted. Furthermore, the size of a cell is 2 to 100 µm, and according to the cryogenic micro grinding, black beans are ground to 5 to 30 µm, which is less than the cell size, so that it can be seen that the elution rate of nutritious ingredients present in the cell wall or cytoplasm increases.

TABLE 3

Analysis of Nutritious Ingredients of Ground Product of Black Beans Obtained by General Grinding and Ground Product of Black Beans Obtained by Cryogenic Micro Grinding

| Nutritious Ingredient | Unit | General grinding | Cryogenic micro grinding |
| --- | --- | --- | --- |
| protein | (g/100 g) | 100 | 100.20 |
| Calorie | (Kcal/100 g) | 100 | 102.80 |
| Fat | (g/100 g) | 100 | 122.14 |
| Ash | (g/100 g) | 100 | 104.54 |
| β-carotene | (µg/100) | 100 | 105.26 |
| Fiber | (g/100 g) | 100 | 106.41 |
| Average retention rate (%) |  | 100% | 106.89 |

As a result of comparing nutritious ingredients between a ground product of black beans obtained by general grinding and a ground product of black beans obtained by cryogenic micro grinding, the ground product obtained by cryogenic micro grinding had a protein retention rate of 100.2%, which is higher than that of the ground product obtained by general grinding, and also exhibited resulting values for excellent nutrition retention property in β-carotene, dietary fiber, and the like.

Example 3

Preparation and Grinding of Edible Insects

For crickets and mealworms, raw materials in a state where crickets and mealworms were fasted prior to shipping and excrements were removed were purchased from an agricultural corporation named Nabimaeul Inc. The crickets and the mealworms were cleanly washed with flowing water and prepared, put into a compressor, and subjected to oil extraction treatment. For oil extraction, 5 kg of a sample was each put into a pocket for extracting oil, the pocket was mounted to an oil extractor machine (National ENG Co., Ltd., Goyan, Korea), and extraction was performed by using the oil extractor machine. In this case, the jacket temperature was 100° C., the extraction time was 15 minutes, and the pressure was 60 MPa.

The prepared crickets and mealworms were immersed into liquid nitrogen and frozen at −190° C. and were subjected to cryogenic micro grinding while the temperature was maintained at −190° C. by supplying liquid nitrogen while grinding the insects. In this case, the particle size of the ground edible insects and the particle temperature were measured to be 10 to 60 μm and −120 to −20° C., respectively. According to the type of edible insect, the introduction temperature, the particle temperature during the grinding process, and the particle size of the ground powder were shown in the following Table 4.

TABLE 4

|  | Introduction temperature (° C.) | Grinding temperature (° C.) | Ground particle size (μm) D50 |
| --- | --- | --- | --- |
| Crickets | −196 | −40~−140 | 20~60 |
| Crickets (dry) | −196 | −20~−120 | 15~55 |
| Mealworms | −196 | −40~−140 | 20~60 |
| Mealworms (dry) | −196 | −20~−120 | 15~55 |

* The expression 'dry' means that the raw material is dried, and then ground by the CMGT.

For the drying process, when the insects were dried before being ground, the insects were dried at 40 to 50° C. for 6 to 12 hours, and then ground by the CMGT, and when the powder is dried after the insects are ground, the powder is dried at 40 to 50° C. for 4 to 10 hours. It could be physically seen that the drying after the grinding generally requires a short time for drying, and reduces the inherent odor from the insect.

For comparison with the cryogenic micro grinding according to the present disclosure, the edible insects were ground by a general grinding method. In the general grinding, the dried raw material was ground by a grinder (DHM-7000CW, Daesung Artlon, Paju, Korea) for 9 minutes, and then a raw material having passed through a 80-mesh net was used as a sample.

In order to study the particle sizes, particle structures and distributions, and structural analyses of a ground product obtained by general grinding and a ground product obtained by cryogenic micro grinding, a particle size analysis was performed. The particle sizes were measured, and imaging data of particles, such as texture, structure, and shape were measured by a scanning electron microscope. The particle size distribution 10% and 90% values, average particle diameters and median values of powder obtained by general grinding and powder obtained by cryogenic micro grinding were measured (Table 5).

TABLE 5

|  |  | Particle size (μm) | | | |
| --- | --- | --- | --- | --- | --- |
|  |  | Average | Median value | d10 | d90 |
| Oil extraction from crickets | General grinding | 52.62 ± 4.22 | 71.563 ± 5.62 | 7.35 ± 1.33 | 216.87 ± 10.56 |
| | Freeze grinding | 19.28 ± 2.17 | 21.45 ± 2.35 | 5.50 ± 0.23 | 57.19 ± 12.80 |
| Oil extraction from mealworms | General grinding | 58.95 ± 35.62 | 92.11 ± 50.44 | 4.30 ± 2.81 | 268.12 ± 114.1 |
| | Freeze grinding | 20.244 ± 2.26 | 24.11 ± 2.67 | 3.75 ± 0.51 | 83.53 ± 7.36 |

Figure 7:
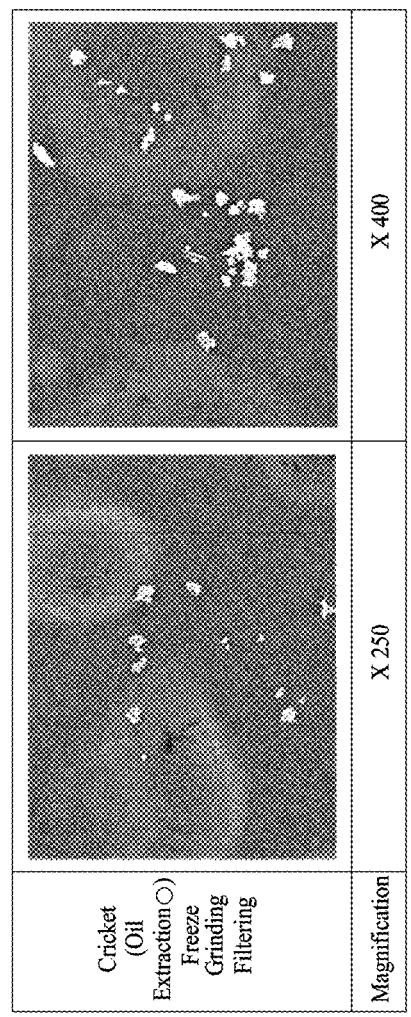
FIG. 7 is an SEM cross-sectional image of powder obtained by subjecting crickets to cryogenic micro grinding.
Figure 8:
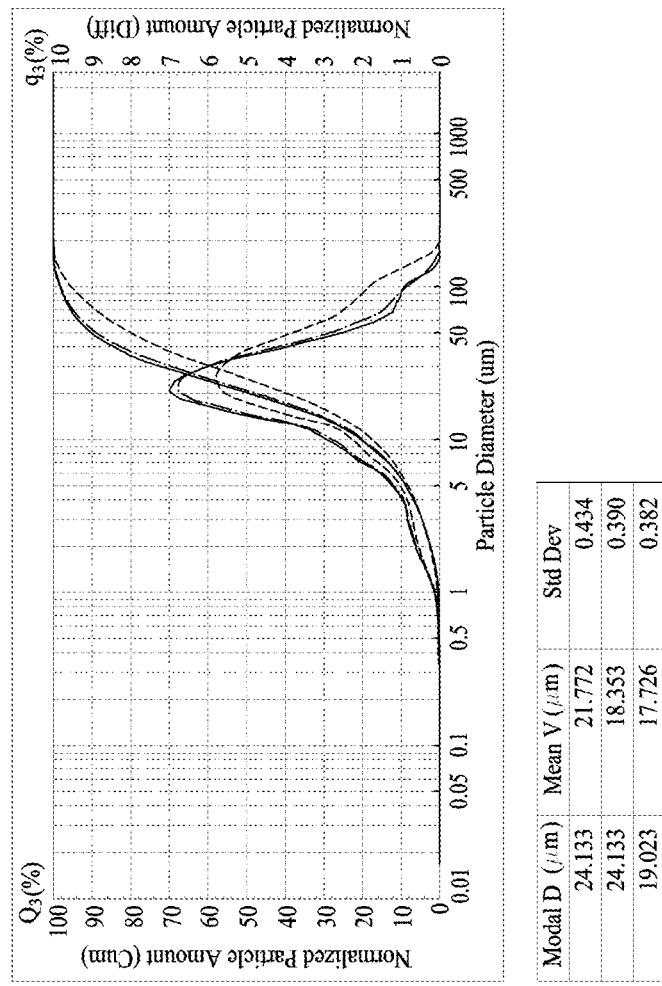
FIG. 8 illustrates particle size analysis results of powder obtained by subjecting crickets to cryogenic micro grinding.
Figure 11:
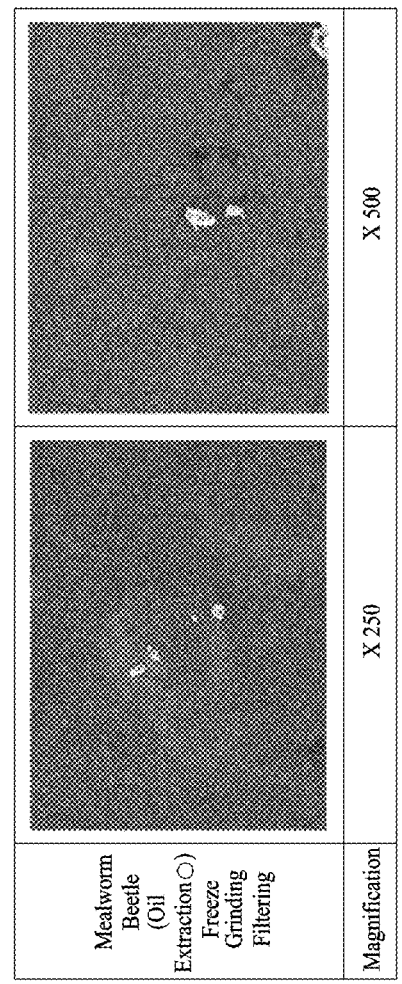
FIG. 11 is an SEM cross-sectional image of powder obtained by subjecting mealworms to cryogenic micro grinding.
Figure 12:
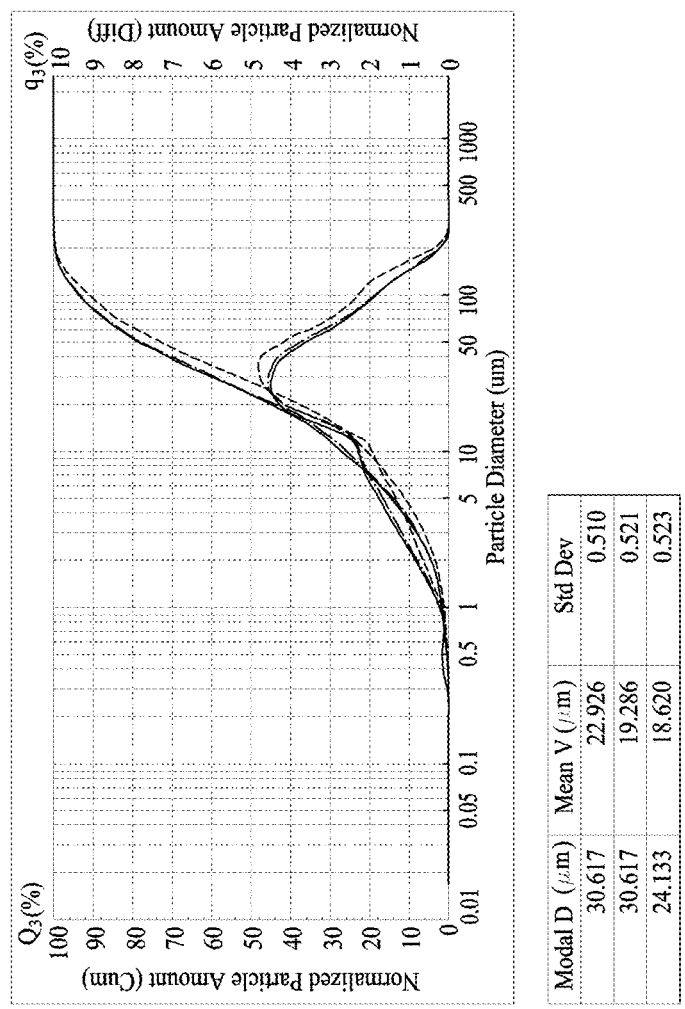
FIG. 12 illustrates particle size analysis results of powder obtained by subjecting mealworms to cryogenic micro grinding.

As a result, it was confirmed that the average particle size of a sample obtained by subjecting crickets treated with oil extraction (removal of fat) to cryogenic micro grinding and filtering the resulting product was 19.28±2.17 μm, the shapes of the particles were generally round or close to a rice grain shape, and the particles were generally evenly distributed (FIGS. 7 and 8). Further, the average particle size of a sample obtained by subjecting mealworms from which oil was extracted to cryogenic micro grinding and filtering the resulting product was 20.244±2.26 μm, and the shapes of the particles were close to a round shape and the particles were evenly distributed (FIGS. 11 and 12).

Figure 10:
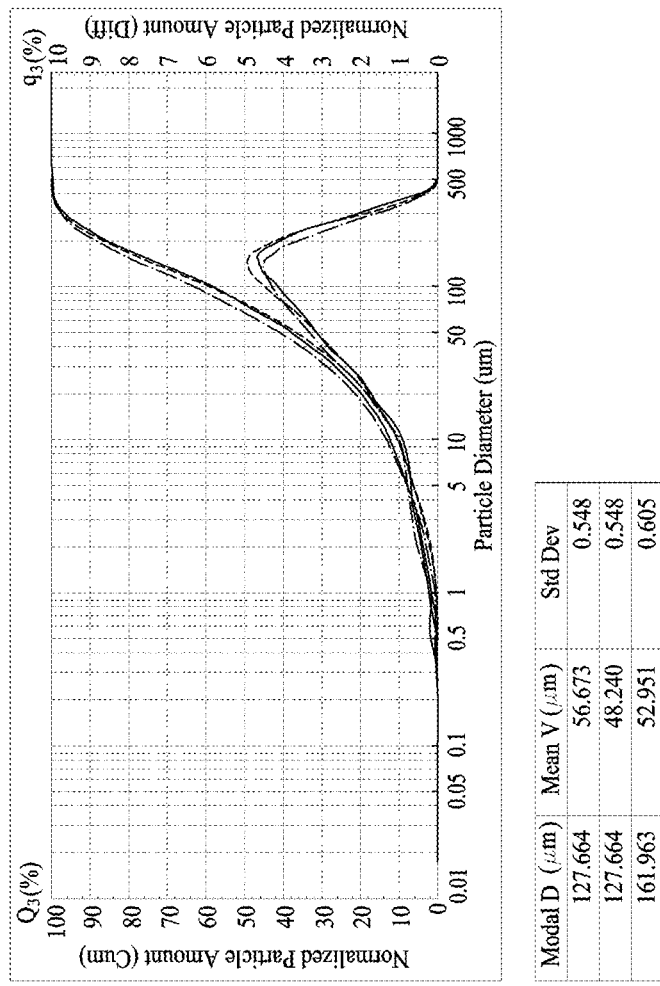
FIG. 10 illustrates particle size analysis results of powder obtained by subjecting crickets to general grinding.
Figure 13:
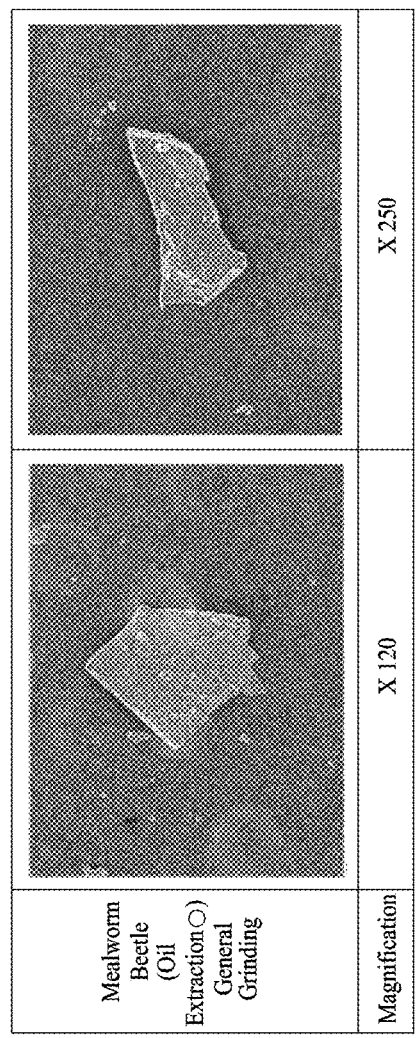
FIG. 13 is an SEM cross-sectional image of powder obtained by subjecting mealworms to general grinding.
Figure 14:
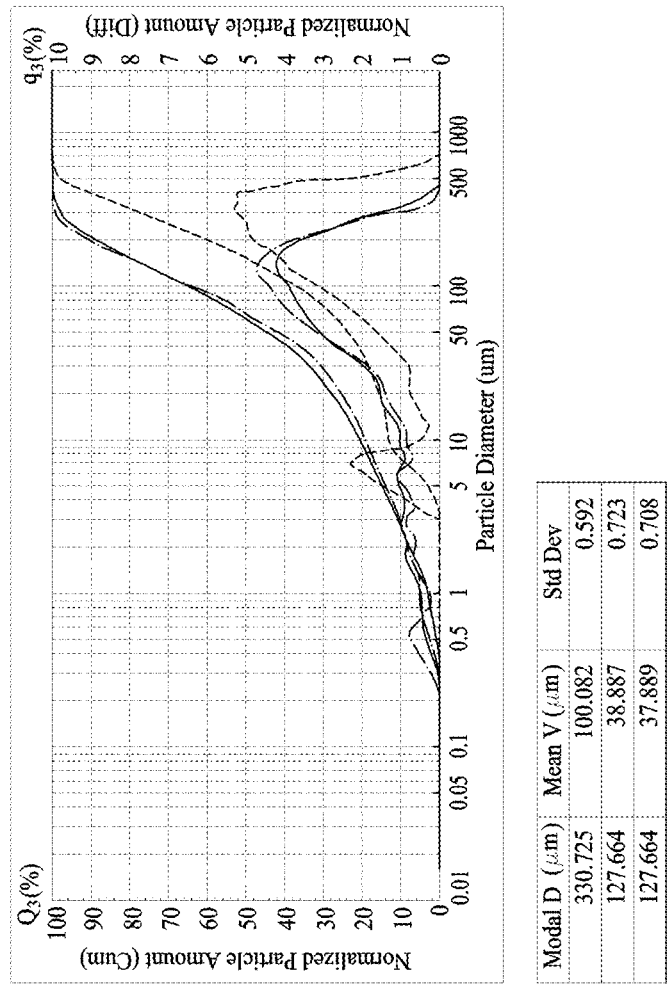
FIG. 14 illustrates particle size analysis results of powder obtained by subjecting mealworms to general grinding.

In contrast, the average particle size of a sample obtained by subjecting crickets from which oil was extracted to general grinding was 52.62±4.22 μm, the shapes of the particles were generally angular or pointed and the particles were distributed in irregular sizes and shapes (FIGS. 9 and 10). In addition, the average particle size of a sample obtained by subjecting mealworms from which oil was extracted to general grinding was 58.95±35.62 μm, most of the shapes of the particles were not round, but were angular, and the shapes and sizes of the particles were irregularly distributed (FIGS. 13 and 14).

Meanwhile, the size of a cell is around 150 μm and the average particle size of ground products of the mealworms obtained by cryogenic micro grinding is 20.244±2.26 μm, so that it can be seen that mealworm/crickets are ground to less than the cell size by the cryogenic micro grinding. Furthermore, a d10 value of 3.75±0.51 from the mealworms by cryogenic micro grinding means that the amount of a powder having a diameter less than the size is 10%, and a d90 value of 83.53±7.36 from the mealworms by cryogenic micro grinding means that the amount of a powder having the size is 90%. For powder with d10 to d90, one cell is degraded into 1/40 to 1/1.79 fragments and most of the insects are ground to less than the cell size, so that it can be seen that the elution rate of nutritious ingredients present in the cell wall or cytoplasm increases.

Example 4

Analysis Results of Nutritious Ingredients of Edible Insects

The analysis of nutritious ingredients was performed in Suwon Women's College Food Analysis Research Center. The contents of the nutritious ingredients shown in the following table were converted into moisture 0% and marked in order to compare the general grinding with the cryogenic micro grinding at 1:1.

4-1 Mealworm

TABLE 6

Comparison of Nutritious Ingredients between Mealworm Raw Material with Oil Extracted and Ground Product Obtained by Cryogenic Micro Grinding

| | | Cryogenic micro grinding | |
|---|---|---|---|
| Nutrient | Mealworm (Raw material) | Content | Retention rate (%) |
| Protein (g/100 g) | 55.61 | 65.37 | 117.55 |
| Ash (g/100 g) | 3.39 | 4.2 | 123.89 |
| Carbohydrate (g/100 g) | 6.01 | 13.22 | 219.97 |
| Ca (mg/100) | 39.16 | 56.56 | 144.43 |
| Fe (mg/100) | 5.22 | 9.73 | 186.4 |
| K (mg/100) | 693.21 | 1014.14 | 146.3 |
| Na (mg/100) | 114.88 | 152.56 | 132.8 |
| P (mg/100) | 723.76 | 984.43 | 136.02 |
| Saturated fat (g/100 g) | 7.57 | 1.64 | 21.66 |
| Niacin (g/100 g) | 7.31 | 11.07 | — |
| Aspartic acid (mg/100 g) | 4172.85 | 5504.3 | 131.91 |
| Threonine (mg/100 g) | 2101.31 | 2624.18 | 124.88 |
| Serine (mg/100 g) | 2574.93 | 2959.84 | 114.95 |
| Glutamic acid (mg/100 g) | 6089.03 | 7888.32 | 129.55 |
| Proline (mg/100 g) | 3201.04 | 4043.85 | 126.33 |
| Glycine (mg/100 g) | 2748.3 | 3217.52 | 117.07 |
| Alanine (mg/100 g) | 4240.99 | 4663.63 | 109.97 |
| Valin (mg/100 g) | 3880.94 | 4541.29 | 117.02 |
| Methionine (mg/100 g) | 67.62 | 620.8 | 918.07 |
| Isoleucine (mg/100 g) | 2031.07 | 2715.88 | 133.72 |
| Leucine (mg/100 g) | 3578.85 | 4817.62 | 134.61 |
| Tyrosine (mg/100 g) | 3760.05 | 4393.85 | 116.86 |
| Phenylalanine(mg/100 g) | 1976.76 | 2438.42 | 123.35 |
| lysine (mg/100 g) | 2723.5 | 3596.62 | 132.06 |
| Histidine (mg/100 g) | 1673.11 | 1996.11 | 119.31 |
| Arginine (mg/100 g) | 2637.34 | 3506.74 | 132.97 |

As a result of comparing the nutritious ingredients between a raw material of the mealworms with fat removal (oil extraction) treatment and a ground product of the mealworm with fat removal (oil extraction) treatment obtained by cryogenic micro grinding, it was observed that the protein retention rate of the ground product obtained by cryogenic micro grinding was 117.55%, and the ground product obtained by cryogenic micro grinding had a more increased protein content than that of the raw material. Besides, it could be seen that amino acid ingredients and the like also exhibited a resulting value maintaining a retention rate of 100% or more, and it was confirmed that saturated fat had a retention rate, which was significantly decreased to 21.66%.

The ground product has a nutritious ingredient retention rate of more than 100% as compared to that of the raw material because the higher the grindability is, the larger the surface area is, and as a result, nutritious ingredients are more likely to be eluted. Furthermore, the size of a cell is around 150 μm, and according to the cryogenic micro grinding, mealworms are ground to 10 to 60 μm, which is less than the cell size, so that it can be seen that the elution rate of nutritious ingredients present in the cell wall or cytoplasm increases.

TABLE 7

Analysis of Nutritious Ingredients of Mealworms with Oil Extracted Between Ground Product Obtained by general grinding and Ground Product Obtained by Cryogenic Micro Grinding

| | | Cryogenic Micro Powder | |
|---|---|---|---|
| Nutrient | General powder Content | Content | Retention rate (%) |
| Protein (g/100 g) | 64.22 | 65.37 | 101.79 |
| Ash (g/100 g) | 3.68 | 4.2 | 114.13 |
| Carbohydrate (g/100 g) | 11.14 | 13.22 | 118.67 |
| Ca (mg/100) | 47.68 | 56.56 | 118.62 |
| Fe (mg/100) | 6.05 | 9.73 | 160.83 |
| K (mg/100) | 838.92 | 1014.14 | 120.89 |
| Na (mg/100) | 129.73 | 152.56 | 117.60 |
| P (mg/100) | 827.14 | 984.43 | 119.02 |
| Saturated fat (g/100 g) | 5.08 | 1.64 | 32.28 |
| Cholesterol (g/100 g) | 62.05 | 54.51 | 87.85 |
| Niacin (g/100 g) | 10.38 | 11.07 | 106.65 |
| Aspartic acid (mg/100 g) | 5246.81 | 5504.3 | 104.91 |
| Threonine (mg/100 g) | 2566.92 | 2624.18 | 102.23 |
| Glutamic acid (mg/100 g) | 7410.16 | 7888.32 | 106.45 |
| Methionine (mg/100 g) | 486.7 | 620.8 | 127.55 |
| Isoleucine (mg/100 g) | 2502.7 | 2715.88 | 108.52 |
| Leucine (mg/100 g) | 4738.59 | 4817.62 | 101.67 |
| Phenylalanine(mg/100 g) | 2338.7 | 2438.42 | 104.26 |
| lysine (mg/100 g) | 3258.59 | 3596.62 | 110.37 |
| Arginine (mg/100 g) | 3328.97 | 3506.74 | 105.34 |

As a result of comparing nutritious ingredients between a ground product of the mealworms with fat removal (oil extraction) treatment obtained by general grinding and a ground product of the mealworms with fat removal (oil extraction) treatment obtained by cryogenic micro grinding, it could be seen that the protein retention rate of the ground product obtained by cryogenic micro grinding was 101.79%, which is a larger value than that of the ground product obtained by general grinding, and mineral ingredients such as calcium were also retained in a larger amount in the ground product obtained by cryogenic micro grinding than that in the ground product obtained by general grinding. It was confirmed that a saturated fat retention rate of the ground product obtained by cryogenic micro grinding was 32.28%, which is a value significantly decreased as compared to that of the ground product obtained by general grinding. The comparison with general amino acid ingredients exhibited high resulting values, and in particular, the content of methionine was higher by 27.55% than that in the ground product obtained by general grinding, and the content of lysine was shown to be higher by 10.37% than that in the ground product obtained by general grinding.

4-2 Cricket

TABLE 8

Comparison of Nutritious Ingredients between Cricket Raw Material with Oil Extracted and Ground Product Obtained by Cryogenic Micro Grinding

| | | Ground product obtained by cryogenic micro grinding | |
|---|---|---|---|
| Nutrient | Crickets (Raw material) | Content | Retention rate (%) |
| Protein (g/100 g) | 66.48 | 71.05 | 106.87 |
| Ash (g/100 g) | 4.26 | 4.49 | 105.4 |
| Fe (mg/100) | 5.97 | 6.83 | 114.41 |
| K (mg/100) | 953.98 | 1106.93 | 116.03 |
| Na (mg/100) | 340.34 | 373.8 | 109.83 |
| P (mg/100) | 839.49 | 918.04 | 109.36 |
| Saturated fat (g/100 g) | 6.82 | 3.7 | 54.25 |

TABLE 8-continued

Comparison of Nutritious Ingredients between Cricket Raw Material with Oil Extracted and Ground Product Obtained by Cryogenic Micro Grinding

| Nutrient | Crickets (Raw material) | Ground product obtained by cryogenic micro grinding | |
|---|---|---|---|
| | | Content | Retention rate (%) |
| Cholesterol (g/100 g) | 163.07 | 140.88 | 86.39 |
| Niacin (g/100 g) | 6.25 | 8.87 | 141.92 |
| Aspartic acid (mg/100 g) | 5344.89 | 5982.87 | 111.94 |
| Threonine (mg/100 g) | 1969.03 | 2565.44 | 130.29 |
| Serine (mg/100 g) | 3174.72 | 3461.16 | 109.02 |
| Glutamic acid (mg/100 g) | 5923.86 | 7483.18 | 126.32 |
| Proline (mg/100 g) | 2895.74 | 3893.99 | 134.47 |
| Glycine (mg/100 g) | 2777.27 | 3463.81 | 124.72 |
| Alanine (mg/100 g) | 4561.08 | 6167.18 | 135.21 |
| Valin (mg/100 g) | 3434.38 | 4895.21 | 142.54 |
| Methionine (mg/100 g) | 74.43 | 829.26 | 1114.15 |
| Isoleucine (mg/100 g) | 2110.8 | 2537.41 | 120.21 |
| Leucine (mg/100 g) | 3938.64 | 5054.84 | 128.34 |
| Tyrosine (mg/100 g) | 2385.51 | 3403.67 | 142.68 |
| Phenylalanine(mg/100 g) | 1853.13 | 2256.78 | 121.67 |
| lysine (mg/100 g) | 2727.84 | 3652.5 | 133.9 |
| Histidine (mg/100 g) | 1198.86 | 1574.9 | 131.37 |
| Arginine (mg/100 g) | 3363.07 | 4288.99 | 127.53 |

Nutritious ingredients between a raw material of the crickets with fat removal (oil extraction) treatment and a ground product of the crickets obtained by cryogenic micro grinding were compared. The protein retention rate of the ground product obtained by cryogenic micro grinding was 106.87%, which is a larger value than that of the raw material, and besides, amino acid ingredients, and the like exhibited a resulting value maintaining a retention rate of 100% or more. Further, it was confirmed that a saturated fat retention rate of the ground product obtained by cryogenic micro grinding was 13.62%, which was significantly decreased as compared to that of the raw material.

Example 5

Comparison of Digestion Rates According to General Grinding and Cryogenic Micro Grinding In order to investigate effects of powdering according to the cryogenic micro grinding on the digestion speed of a protein, tyrosine produced by treating the protein with a proteolytic enzyme (protease) was stained, the absorbance was measured at 660 nm, and the resulting values were compared, thereby comparing effects of powdering on the digestion speed of the protein.

Analysis of Protein Digestion Rate

In order to compare the digestion rates of samples for protease which is a protein digestion agent, a method of measuring a protease titer was modified and used in accordance with the Ministry of Food and Drug Safety regulation. L-tyrosine (BCBT5226, Sigma Aldrich, USA) produced after digesting the sample with protease (SLBT3383, Sigma Aldrich, St. Louis, USA) was stained with a foreign test solution, and the absorbance was measured at 660 nm by using a microplate reader (Spectramax iD3, Molecular Devices, California, USA), thereby comparing the digestion rates. When the intensity of light after transmission is divided by the intensity of light before transmission, the transmittance is calculated, and the absorbance is calculated from absorbance=1−transmittance. Accordingly, an absorbance of 0 means complete transmission, and an absorbance of 1 means complete absorption.

About 5.0 g of a protease powder was precisely weighed and dissolved in water or a buffered solution to prepare a 100 mL of a solution, and then the resulting solution was filtered and used as an enzyme solution. 1 mL of a 0.6% sample solution was put into a test tube and warmed in a constant-temperature water bath at 37° C. 1 mL of the enzyme solution was precisely put thereinto, the resulting mixture was well shaken and mixed, and then immediately, the test tube was put into a constant-temperature water bath at 37° C. to react the resulting mixture for exactly 10 minutes. 2 mL of a 0.4 M trichloride acetate solution was put thereinto, the resulting mixture was reacted at 37° C. for 25 minutes (an enzyme reaction was terminated), and then the resulting product was filtered. 1 mL of the filtrate was precisely put into a test tube, 5 mL of a 0.4 M sodium carbonate solution and 1 mL of a foreign test solution (a solution obtained by diluting the stock solution three times) were put thereinto, the resulting mixture was well shaken, mixed, and reacted at 37° C. for 20 minutes, and then the stained solution was used as a test solution. Apart from this, exactly 1 mL of an enzyme solution was taken put into a test tube, and reacted at 37° C. for 10 minutes, and then 2 mL of a 0.4 M trichloride acetate solution was put thereinto, the resulting mixture was blended to remove the enzymatic activity, 1 mL of a 0.6% test solution was added thereto, the resulting mixture was left to stand at 37° C. for 25 minutes, and then the resulting product was manipulated in the same manner as in the following test solution and used as a blank test solution. The absorbance was measured at a liquid layer of 1 cm and a wavelength of 660 nm by using water as a control solution, and the digestion rates were compared by comparing the absorbance of a sample treated with protease with the absorbance of the control solution.

TABLE 9

Analysis Result of Protein Digestion Rate

| Item | General grinding (A) | Cryogenic micro grinding (B) | Comparison of digestion efficiencies (%, B/A × 100) |
|---|---|---|---|
| Black bean (Seoritae) | 0.879 | 0.889 | 101.14 |

TABLE 10

Analysis Result of Protein Digestion Rate

| Item | General grinding (A) | Cryogenic micro grinding (B) | Comparison of digestion efficiencies (%, B/A × 100) |
|---|---|---|---|
| Crickets (Oil extraction) | 0.830 | 0.935 | 112.65 |
| Mealworms (Oil extraction) | 0.873 | 0.926 | 106.07 |

As a result, it was confirmed that the digestion efficiency value of black beans subjected to cryogenic micro grinding was 101.14% as compared to that of black beans subjected to general grinding, and the digestion rate in the cryogenic micro grinding was improved as compared to that in the general grinding. It was confirmed that the digestion efficiency values of crickets and mealworms subjected to cryogenic micro grinding were 112.65% and 106.07%, respectively, as compared to those of crickets and mealworms subjected to general grinding, and the digestion rates in the cryogenic micro grinding were significantly improved as compared to those in the general grinding, and from this confirmation, it could be confirmed that when ground products obtained by cryogenic micro grinding are taken in, proteins would be digested in vivo better than in the case of the general grinding.

INDUSTRIAL APPLICABILITY

When the method for producing a powder according to the present invention is used, a micro ground powder may be provided while preserving well nutritious ingredients of a raw material.

It is to be understood that the above-described products and methods are merely illustrative embodiments of the principles of this disclosure, and that other compositions and methods may be devised by one of ordinary skill in the art, without departing from the spirit and scope of the present invention. It is also to be understood that the disclosure is directed to embodiments both comprising and consisting of the disclosed parts.

What is claimed is:

1. A method of producing a protein-containing powder comprising:
   (a) providing a protein-containing raw material;
   (b) freezing the protein-containing raw material at −196° C. to −80° C.;
   (c) grinding the protein-containing raw material to obtain the protein-containing powder; and
   (d) removing fat from the protein-containing raw material after step (a),
   wherein an average particle size of the protein-containing powder is smaller than a cell size of the protein-containing raw material, and
   wherein the protein-containing raw material is cricket or mealworm, and the average particle size of the protein-containing powder is 10 to 60 μm.

2. The method of claim 1, wherein the protein-containing powder has a higher nutrient retention rate than the protein-containing raw material.

3. The method of claim 1, wherein the protein-containing powder has a higher in vivo digestion rate than the protein-containing raw material.

4. The method of claim 1, further comprising: drying the protein-containing raw material at 40 to 50° C. for 6 to 12 hours after step (a).

5. The method of claim 1, further comprising: drying the protein-containing powder at 40 to 50° C. for 4 to 10 hours after step (c).

6. The method of claim 1, wherein the freezing is performed by using a liquid nitrogen.

7. The method of claim 1, wherein the temperature of the protein-containing powder is maintained between −140° C. to −20° C. during the grinding step (c).

* * * * *